Nov. 23, 1971 HISAO TAKEI ET AL 3,621,641
ELECTRIC CLEANER

Filed Nov. 21, 1969 3 Sheets-Sheet 1

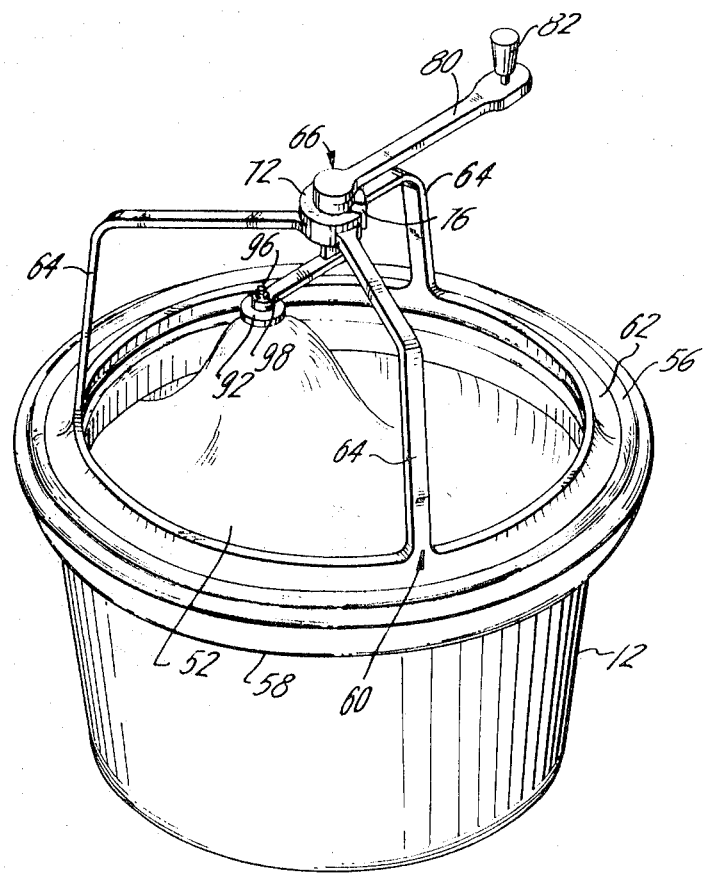
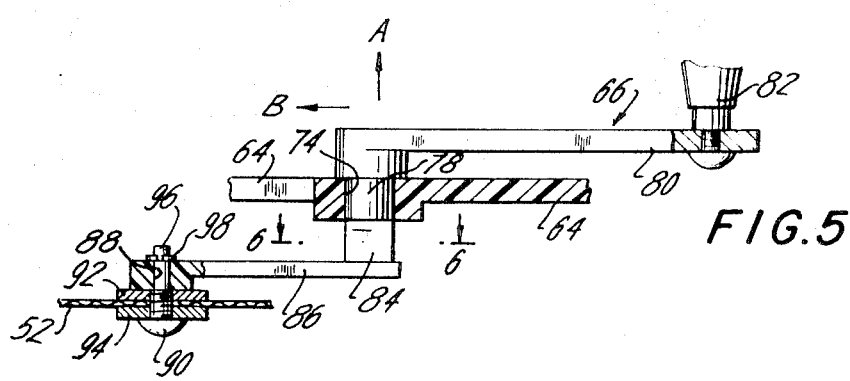

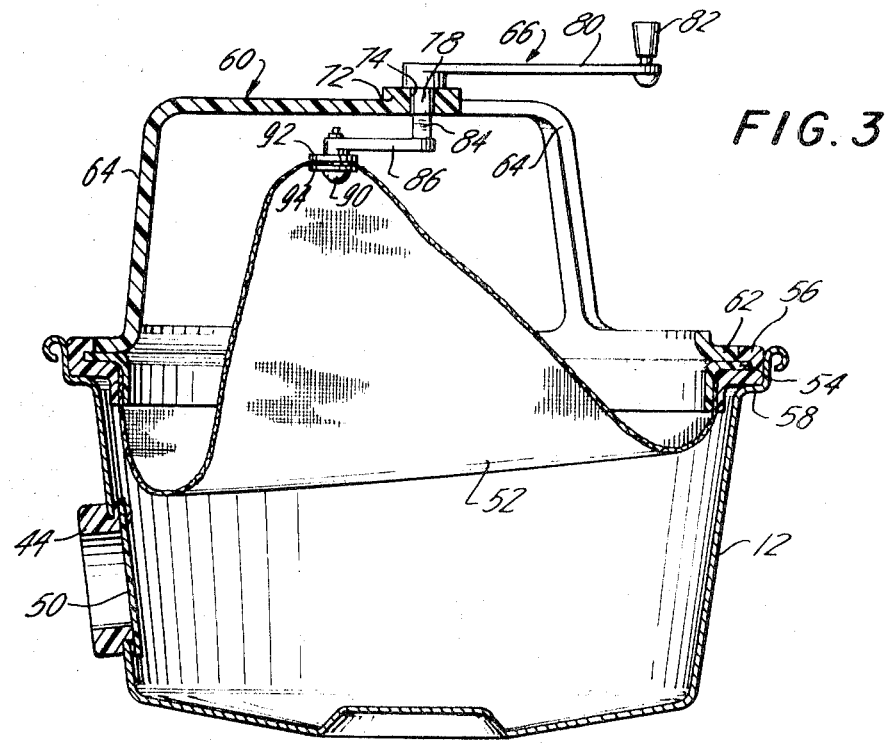

United States Patent Office
3,621,641
Patented Nov. 23, 1971

3,621,641
ELECTRIC CLEANER
Hisao Takei and Satoru Kato, Gunma Prefecture, Japan, assignors to Mitsubishi Denki Kabushiki Kaisha, Tokyo, Japan
Filed Nov. 21, 1969, Ser. No. 878,836
Int. Cl. B01d 46/04
U.S. Cl. 55—305
4 Claims

ABSTRACT OF THE DISCLOSURE

A flexible filter for straining out dirt sucked through rotation of an electric blower is disposed in opposite relationship with a rotatable dusting lever such that one portion of the filter is secured to that end eccentric to the center of rotation of the filter. The filter is rotated to vibrate, expand and contract the filter to remove the dirt stuck to the filter from it.

BACKGROUND OF THE INVENTION

This invention relates to an electric cleaner and more particularly to improvements in an electric cleaner for domestic use.

In electric cleaners including a woven filter for straining out dust or dirt sucked through the rotational movement of the associated electrically operated blower, there has been generally a fear that, as cleaning proceeds relatively fine particules of dirt are progressively accumulated to the surface of the filter as by the ingress of the particles into the texture of the filter leading to a decrease in suction by the blower and therefore to the great deterioration of the performance of the cleaner. This has resulted in the necessity of performing the operation of removing the accumulated dirt from the filter at suitable intervals of time. For that purpose, there have been previously proposed various attempts. For example, a filter holder disposed oppositely to the filter could be provided with a rotatable lever including a brush. During the rotational movement of that lever, the brush has been adapted to slide along the surface of the filter under a suitable pressure to sweep off dirt stuck to the filter from the latter. With that measure it has been difficult to sweep off all particles of dirt including those clogging up the texture of the filter and it has required a relatively long time to completely remove the dirt from the filter. Also because the brush is put in direct contact with the filter, the latter could be apt to damage resulting in a great decrease in its useful lifetime.

SUMMARY OF THE INVENTION

Accordingly it is an object of the invention to provide a new and improved electric cleaner including a flexible filter long in useful lifetime and capable of rapidly sweeping the dirt stuck to the filter off from the latter.

It is another object of the invention to provide a new and improved electric cleaner capable of hygenically sweeping dirt stuck to a filter involved off the latter without the necessity of directly contacting the user's hand with the filter.

The invention accomplishes the above cited objects by the provision of an electric cleaner comprising a main hollow body, a suction port and an exhaust port disposed on the main body, blower means disposed within the main body to be operative to suck dirt-bearing air through the suction port, flexible filter means disposed within the main body to strain dirt and permit air free from dirt to be exhausted through the exhaust port, and dusting rotatable lever means rotatably disposed within the main body, characterized in that the dusting lever means oppose to the filter means and include that rotatable end eccentric to the center of rotation of the lever means and having secured thereat one portion of the flexible filter means.

Preferably, the filter means may be held by a holder frame including a central portion concaved in one direction and capable of being concaved in the opposite direction, and the dusting lever means are detachably supported on the bottom of the concave portion of the holder frame.

Advantageously, the holder frame includes a central hub on which a notch and a through hole are disposed to communicate with each other, on the one hand, and dusting lever means include a shaft whose axis is the center of rotation, consisting of a rectangular shaft portion of smaller size capable of being fitted into the through hole through the notch and a circular shaft portion of larger diameter coaxial to the rectangular shaft portion and rotatably supported in the through hole on the other hand.

BRIEF DESCRIPTION OF THE DRAWINGS

The invention will become more readily apparent from the following detailed description taken in conjunction with the accompanying drawings in which;

FIG. 2 is a perspective view of the cleaner shown in FIG. 1 and at its dirt removing position with the upper casing removed;

FIG. 3 is a longitudinal sectional view of the device shown in FIG. 2 with parts broken away;

FIG. 5 is a side elevational view, partly in section of the dusting lever shown in FIG. 4;

FIG. 6 is a sectional view taken along the line VI—VI of FIG. 5; and

FIG. 7 is a longitudinal sectional view of a modification of the invention with parts illustrated in elevation.

DESCRIPTION OF THE PREFERRED EMBODIMENTS

Figure 1:
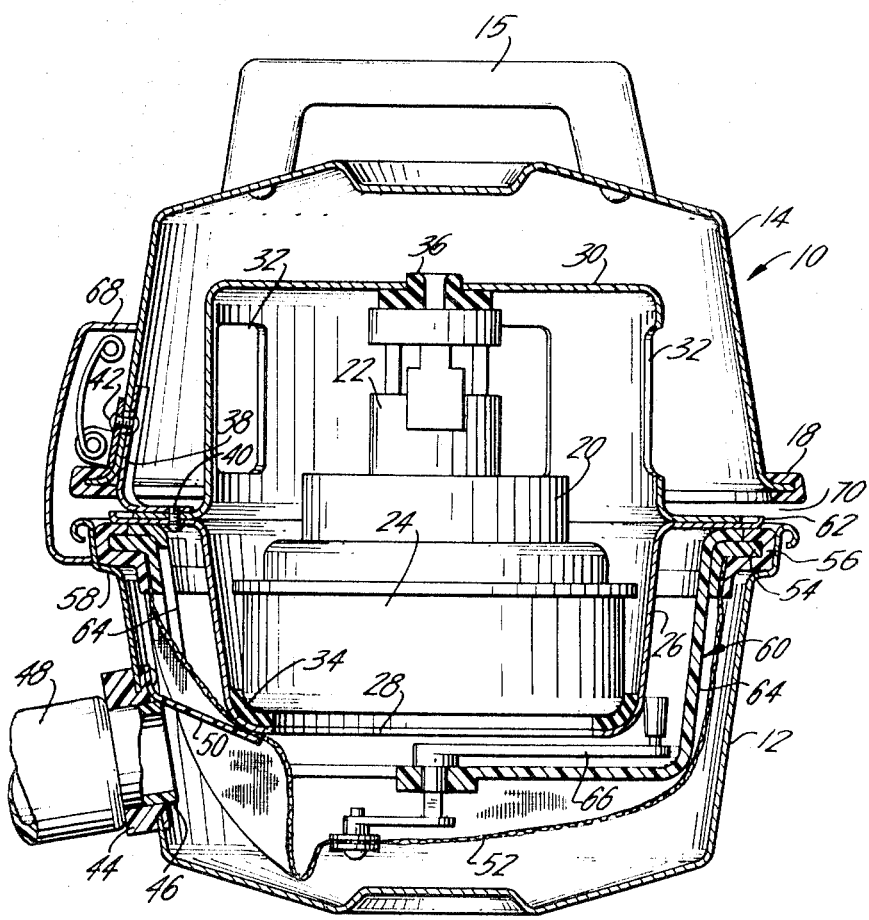
FIG. 1 is a side elevational view, partly in longitudinal section of an electric cleaner constructed in accordance with the principles of the invention.

Referring now to the drawings and FIG. 1 in particular, it is seen that an electric cleaner disclosed herein comprises a main hollow body generally designated by the reference numeral 10 and composed of a lower metallic casing 12 serving to collect dirt and an upper metallic casing 14. The upper casing 14 has rigidly secured to the outer and upper surface a handle 15 and fitted onto the peripheral edge a guard ring 18. Vertically disposed within the main cleaner body 10 is a blower unit generally designated by the reference numeral 20 and including an electric motor 22 and a fan 24 directly connected thereto. The blower unit 20 is vertically carried or sandwiched between a lower metallic support member 26 having a vent hole 28 disposed oppositely to the fan 24 and an upper metallic support member 30 having vent holes 32 disposed on the periphery through shock absorbers 34 and 36 made, for example, of rubber with the peripheral edge portions of both support members superposing each other. As shown in FIG. 1, the blower unit 20 is disposed within the upper casing 14 so as to cause the lower end to project beyond the casing 14 by having a mounting bracket 38 secured to both the upper casing and support member 14 and 30 respectively. More specifically, the mounting bracket 38 has one side fixed in superposing relationship to the superposed portions of the support members 26 and 30 by screws 40 (only one of which is illustrated) and the other side riveted at 42 to the adjacent portion of the upper casing 14.

The lower casing 12 has sealed through the lower portion of its peripheral wall a connection tube 44 provided with a suction port 46 extending therethrough. The connection tube 44 is detachably connected at the exposed end to a suction hose 48 and provided at the opposite or inner end with a valve plate 50 made, for example, of rubber. The valve plate 50 is pivotally secured on one side to the inner end of the connection tube 44 to normally close that inner end (see FIG. 3). However, when the suction hose 48 is fitted into the connection tube 44 the end of the hose 48 pushes against the valve plate 50 to open the suction port 46 as shown in FIG. 1.

Disposed within the lower casing 12 is flexible filter 52 composed of plural laminations of cotton fabric alone or plural laminations of cotton fabric alternating laminations of nylon fabric or the like and having a peripheral edge rigidly secured to a mounting annulus 54 of any suitable plastic whose outer edge is enclosed with a U-shaped resilient packing 56 made, for example of rubber. Then the U-shaped packing 56 rests on a horizontal flared shoulder 58 disposed on the periphery of the opening of the lower casing 12 to permit the filter 52 to be centrally pendent within the casing 12. Disposed on the inside or the upper side as viewed in FIG. 1 of the filter 52 is a holder frame generally designated by the reference numeral 60 and including a peripheral flange 62 disposed upon the mounting annulus 54 for the filter 52 to be substantially flush with the upper leg of the U-shaped packing 56. The holder frame 60 includes three support arms 64 disposed at substantially equal angular intervals and normally extending into downwardly concave shape from the flange 62 to a common point located substantially on the longitudinal axis of the lower casing 12, at which point is connected a dusting lever generally designated by the reference numeral 66 as will be described hereinafter.

As shown in FIG. 1, the upper casing 14 is operatively coupled to the lower casing 12 by a latch 68 while the superposed portions of the upper and lower support members 30 and 26 respectively are hermetically laid on the upper face of the holder frame 60. Under these circumstances both the casings form an annular opening between their peripheral edges providing an exhaust port 70.

The three holder arms 64 are converged into a hub 72 (see FIGS. 2 and 3) having a central circular hole 74 (see FIG. 3) extending therethrough and communicating with a radial notch 76 also disposed on the hub 72. The notch 76 has a width smaller than the inside diameter of the hole 74 for the purpose as will be apparent hereinafter.

Figure 4:
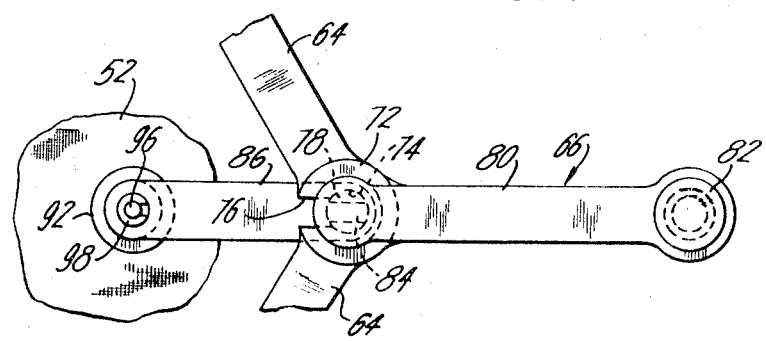
FIG. 4 is a plan view of the dusting lever shown in FIG. 2 after it has been assembled.

As best shown in FIG. 3, the abovementioned dusting lever 66 is rotatably supported to the holder frame 60 by having its shaft portion 78 rotatably fitted into the through hole 74 on the hub 72. As shown in FIGS. 4 and 5, the dusting or dirt removing lever 66 comprises an arm 80 extending substantially perpendicularly to the longitudinal axis of the shaft portion 78, a knob 82 rotatably secured at the free end of the arm 80, and a shaft portion 84 of rectangular cross section projecting beyond the lower face of the shaft portion 78 and integral therewith. The rectangular cross section of the shaft portion 84 has one side $l$ smaller than the width of the notch 76 and the other side L longer than the latter (see FIGS. 4 and 6). The rectangular shaft portion 84 has another arm 86 extending therefrom in parallel relationship with the arm 80 but oppositely to the latter and provided at the free end with a bore 88 extending therethrough and substantially perpendicular to the longitudinal axis thereof. Then a screw 90 is threaded into the bore 88 to firmly connect a pair of washers 92 and 94 together between which the substantially central portion of the filter 52 is sandwiched. The screw 90 has an extension 96 of reduced diameter rotatably fitted into the abovementioned bore 88 on the arm 86. The exposed portion of the screws extension 96 has operatively coupled to a C-shaped ring 98 serving to prevent the screw 90 from slipping down from the bore 88.

With the arrangement illustrated it will be appreciated that the central portion of the filter 52 is secured to the dusting lever 66 while it is eccentric to the center of rotation of the filter 52 by an amount substantially equal to the length of the arm 86.

The operation of the arrangement as above described will now be described. In FIG. 1 it is assumed that the blower unit 20 is put in operation to suck dirt-bearing air through the suction hose 48 and the suction port 46 into the interior of the lower or dirt collecting casing 12. Upon the sucked air, striking against the filter 52, the dirt contained in the air is intercepted by the filter 52 and progressively accumulated on the outer surface thereof. At the same time the air substantially free from dirt is permitted to pass through the filter 52, and the vent ports 28 and 32 on the upper and lower support frames 30 and 26 until it is exhausted externally of the main cleaner body 10 through the exhaust port 70. One portion of the dirt intercepted by the filter can, of course, fall in the dirt collection casing 12. It will readily be understood that the operation as above described is the same as that performed by the conventional type of electric cleaners.

It will be appreciated that in operation dirt could be progressively stuck to or accumulated on the filter 52 to weaken the suction of the cleaner. In that event the latch 68 can be released after which the upper casing 14 along with the blower unit 20 is removed from the lower or dirt collecting casing 12. Then the knob 82 is manually operated to rotate the dusting lever 66 about the axis of the shaft portion 78. This rotational movement of the lever 66 causes its arm 86 to be rotated about the axis of the shaft portion 78 while at the same time vibrating the extremity of the arm 86 to an extent determined by the slack of the filter due to its eccentric mounting as previously described. This rotational movement of the filter 52 is accompanied by expansion or contraction of the filter 52 whose magnitude is substantially equal to its slack as above described. The rotational movement of the arm 86 cooperates with the vibrational movement of the filter 52 to be effective for sweeping the accumulated dirt off from the filter 52.

If it is attempted to sweep the dirt off from the filter 52 in the manner as above described while the latter remains pendent within the dirt collection casing 12 as shown in FIG. 1 then there is an objection that the dirt deposited on the bottom of the lower casing 12 will be whirled up to be again stuck to the filter 52.

In order to avoid that objection, means is provided for somewhat lifting the filter 52. More specifically, as shown in FIGS. 2 and 3, the arm 80 of the dusting lever 66 is adapted to be upwardly moved with respect to the holder frame 26 in the direction of the arrow A shown in FIG. 5 until the rectangular shaft portion 84 is positioned within the hole 74 on the hub 72 of the arm 80. Then the lifted shaft portion 84 is moved in the direction of the arrow B shown in FIG. 6 to be drawn out from the notch 76 resulting in the removal of the dusting lever 66 from the holder frame 60. Thereafter the holder frame 60 is caused to change from its position illustated in FIG. 1 to its position illustrated in FIGS. 2 and 3. That is, the holder frame 60 with filter 52 is turned upside down so that the downwardly concave arms 64 are rendered convex upwardly with the flange 62 disposed in superposed relationship on the annulus 54 of the filter 52.

Then the dusting lever 66 is again operatively connected to the holder frame 60 in the manner reversed from that above described in conjunction with the removal of the lever from the holder. More specifically, the rectangular shaft portion 84 is first fitted into the notch 76 on the arm hub 72 and then depressed until the circular shaft portion 78 engages the hole 74 on the hub 72. FIG. 2 illustrates the resulting positional relationship between the holder frame 60 and the dusting lever 66 in which it is noted that, the arm 86 of the dusting lever 66 serves to maintain the filter 52 at a very high level relative to the dirt collection casing 12 as compared with the level occupied in the operation of collecting dirt.

Then the knob 82 is manually operated to sweep the accumulated dirt from the filter 52 in the same manner as previously described. Since the filter 52 is now sufficiently separated away from the bottom of the dirt collection casing 12 only a small amount of the dirt deposited on the bottom of the casing 12 is allowed to be whirled up.

If dirt has filled the dirt collection casing 12 then the suction hose 48 can be removed from the suction port 44 and the holder frame 60 along with the filter 52 is removed from the dirt collection casing 12. Then the dirt collection casing 12 filled with the dirt is brought to a predetermined place for discarding the dirt.

Referring now to FIG. 7 wherein like reference numerals designate the components identical or corresponding to those illustrated in FIG. 1, there is illustrated a modification of the invention including the lateral type of the main hollow body other than the vertical type as shown in FIGS. 1 through 3. The arrangement illustrated comprises a main body 10 in the form of a hollow cylinder divided into a pair of compartments by a vent port 28, blower unit 20 laterally disposed in place within one of the compartments by having opposite shock absorbers 34 and 36 of rubber sandwiching the unit therebetween and the dirt collection casing 12 detachably connected to the lower side of the other compartment. As in the arrangement of FIG. 1, the blower unit 20 includes an electric motor 22 and a fan 88 directly facing the vent port 28. The flexible filter 52 is loosely disposed to cover the vent port 28.

Within the other compartment, an electric motor 100 is coaxially disposed in opposite relationship with the filter 52 by having that end face remote from the latter and rigidly secured to the end face of the other compartment. The motor 100 includes a rotary shaft 102 having an arm 104 fixed at one end thereto and extending substantially perpendicularly to the axis of the shaft. The arm 104 is provided at the other end eccentric to the axis of the rotary motor shaft 102 with a pin 106 rotatably connected to a pair of superposed washers 108 and 110 having sandwiched therebetween substantially the center of the filter 52.

The dirt collection casing 12 communicates with the other compartment through a dirt falling port 112 disposed on the adjacent portion of the side wall thereof. The other compartment is provided on the end face with the suction port 49 disposed above the motor 100 detachably connected to the suction hose 46 while the exhaust ports 70 are disposed on the end wall of the one compartment.

In operation large particles of dirt sucked through the suction port 46 will fall through the falling port 112 into the dirt collection casing 12 to be deposited on the bottom thereof, while only fine particles of the dirt is stuck to the filter 52. If the arrangement has decreased in suction power due to the dirt accumulated on the filter 52 the motor 100 can be driven. Then the dusting arm 104 is rotated to sweep the accumulated dirt off from the filter 52 in the manner as previously described in conjunction with FIGS. 2, 3 and 4. It will be appreciated that with the arrangement illustrated, the filter 52 is sufficiently separated from the bottom of the dirt collection casing 12.

The invention has several advantages. For example, the dirt stuck to the filter 52 can be rapidly and hygienically swept off from the latter. The filter has a long useful life because the dirt accumulated on the same is swept off by means of the so-called screening action while it is prevented from being subject to sliding friction. Also upon removing the dirt from the filter, the latter is separated from the bottom of the dirt collection casing ensuring that the dirt deposited on the bottom of the collection casing is prevented from being whirled up to be again stuck to the filter.

What we claim is:

1. An electric cleaner device comprising, in combination, a main hollow body housing, a suction inlet port and an exhaust port spaced from the inlet port and disposed on said main body housing, blower means disposed within said main body housing operative to suck dirt-bearing air through said suction port, during rotational movement thereof, flexible porous filter means disposed within said main body housing to strain dirt from dirt-bearing air and permit air free from dirt to be exhausted though said exhaust port, and dust removing lever means disposed in opposite relationship with said filter means rotatably mounted within said main body housing at one end, said dust removing lever means including means connected to its rotatable end eccentric to the center of rotation thereof and being connected to one portion of said flexible filter means eccentric thereof.

2. An electric cleaner device as claimed in claim 1, comprising a holder frame means disposed in opposite relationship with said filter means within said main body housing to hold said filter means, said holder frame means including a central portion normally concave in one direction and capable of being reversed in the direction to render said central portion concave, said dust removing lever means being detachably supported on the bottom of said concave portion of said holder frame means.

3. An electric cleaner device as claimed in claim 1 wherein said holder frame means includes a central hub, on which a notch and a through hole are disposed to communicate with each other, said dust removing lever mean includes a shaft consisting of a rectangular shaft portion of smaller size being fitted into said through hole through said notch and a circular shaft portion of larger diameter coaxial to said rectangular shaft portion and rotatably supported in said through hole whereby said holder frame means can be reversed.

4. An electric cleaner device as claimed in claim 1, comprising an electric motor disposed within said main body housing connected to said dust removing lever means to rotate it thereby to move said filter means, a dirt falling port disposed on said main body housing at its position directly below said filter means, and a dirt collection casing detachably disposed on said main body housing to cover said dirt falling port.

References Cited

UNITED STATES PATENTS

| | | | |
|---|---|---|---|
| 2,522,498 | 9/1950 | Beede | 55—305 |
| 3,236,032 | 2/1966 | Yasukawa et al. | 15—352 |
| 3,413,779 | 12/1968 | Takahashi et al. | 55—304 |

DENNIS E. TALBERT, Jr., Primary Examiner

B. NOZICK, Assistant Examiner

U.S. Cl. X.R.

15—327 D, 327 E, 352; 55—356, 366, 367, 373, 379, 382, 410, 429, 471, 472, 486, 500, 502, 503, 511, 528; 285—7